US007263689B1

(12) United States Patent
Edwards et al.

(10) Patent No.: US 7,263,689 B1
(45) Date of Patent: Aug. 28, 2007

(54) APPLICATION PROGRAM INTERFACE FOR DYNAMIC INSTRUMENTATION OF A HETEROGENEOUS PROGRAM IN A DISTRIBUTED ENVIRONMENT

(75) Inventors: Andrew J. Edwards, Redmond, WA (US); Carlos P. Gomes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 969 days.

(21) Appl. No.: 10/001,280

(22) Filed: Nov. 1, 2001

Related U.S. Application Data

(63) Continuation-in-part of application No. 09/343,276, filed on Jun. 30, 1999, now Pat. No. 6,662,356.

(51) Int. Cl.
G06F 9/44 (2006.01)
G06F 17/30 (2006.01)
G06F 7/00 (2006.01)
(52) U.S. Cl. .................. 717/127; 707/100; 707/201
(58) Field of Classification Search ............... 707/201; 717/127, 108
See application file for complete search history.

(56) References Cited

U.S. PATENT DOCUMENTS

| 5,664,191 | A | 9/1997 | Davidson et al. | |
| 5,790,858 | A | 8/1998 | Vogel | |
| 6,237,024 | B1 * | 5/2001 | Wollrath et al. | 709/203 |
| 6,381,616 | B1 | 4/2002 | Larson et al. | 707/201 |
| 6,460,178 | B1 | 10/2002 | Chan et al. | 717/147 |
| 6,481,008 | B1 | 11/2002 | Chaiken et al. | 717/158 |
| 6,662,356 | B1 * | 12/2003 | Edwards et al. | 717/113 |
| 6,792,595 | B1 * | 9/2004 | Storistenau et al. | 717/110 |

OTHER PUBLICATIONS

Chang et al., "An Efficient Thread Architecture for a Distributed Shared Memory on Symmetric Multiprocessor Clusters" 1998 IEEE p. 816-822.*
Srivastava et al., "Vulcan-Binary Transformation in a Distributed Environment" Microsoft Research Technical Report MSR-TR-2001-50. p. 1-12.*
Anderson et al., "The Performance Implications of Thread Management Alternatives for Shared-Memory Multiprocessors" IEEE 1989 p. 1631-1644.*
Giordano et al., "Constant Propagation in a Hierarchical Intermediate Program Representation" 1999 International Journal of High Speed Computing abstract p. 1.*

* cited by examiner

*Primary Examiner*—Anthony Knight
*Assistant Examiner*—Tom Stevens
(74) *Attorney, Agent, or Firm*—Merchant & Gould P.C.

(57) ABSTRACT

Described is an application program interface (API) that enables dynamic modification to applications executing in a heterogeneous distributed computing environment. The application program interface includes a navigation function, a query function, a thread management function, and a modifier function. The navigation function returns program information for a local or remote computer (i.e., specified computing device). The query function returns information about a program on the specified computing device. The thread management function controls execution of other programs on the specified computing device. The modifier function modifies a system memory on the specified computing device that stores the heterogeneous program. The API works in conjunction with a hierarchical intermediate representation of the heterogeneous program such that predefined program tools can modify the intermediate representation and write these modifications to the specified computing device while the heterogeneous program remains operational.

20 Claims, 6 Drawing Sheets

APPLICATION PROGRAM INTERFACE FOR DYNAMIC INSTRUMENTATION OF A HETEROGENEOUS PROGRAM IN A DISTRIBUTED ENVIRONMENT

RELATED APPLICATIONS

This is a continuation-in-part of U.S. application Ser. No. 09/343,276, filed Jun. 30, 1999, entitled issued as U.S. Pat. No. 6,662,356 "Application Program Interface for Transforming Heterogeneous Programs."

FIELD OF THE INVENTION

The present invention relates generally to programming tools, and more particularly to debugging tools operating in a heterogeneous environment.

BACKGROUND OF THE INVENTION

In the past, when a computer experienced a problem with one of its applications while running online, the computer was taken offline to simulate the problem. However, with the advent of the Internet, computers cannot be taken offline so readily in order to identify the problem. Typically, these computers are running numerous applications and are servicing several requests from different Internet users at any one time. Therefore, it is undesirable for these computers to be taken offline. Rather, it is desirable for these computers to remain operational (i.e., "live") at all times. Thus, these computers are commonly referred to as "live" systems.

Even if it were allowable to take these computers offline, there would still be problems with diagnosing the problem offline. For example, the problems occurring online are typically related to the loading and unique circumstances of the computer at the time the problem occurred. Thus, if the computer were taken offline, the problem would disappear. In addition, for computers operating in a heterogeneous distributed computing environment, the problem is even more difficult to diagnose offline. These computers in this distributed computing environment may have various architectures and run various operating systems. The applications on these computers may have heterogeneous components that have routines in different instruction sets (i.e., Intel x86, Intel IA-64, Visual Basic (VB) byte code, Java class files, and other Virtual Machine (VM) binary). In addition, the heterogeneous components may be operating on different computers. Thus, it is difficult to generate a test scenario that has the same distribution of applications and components and has the same loading. Therefore, offline testing of computers is not very successful in duplicating and solving problems occurring on computers operating on the Internet.

Until now, there has been no workable solution for analyzing live systems in a heterogeneous distributed computing environment.

SUMMARY OF THE INVENTION

The present invention provides an application program interface (API) for dynamically analyzing and modifying applications that are executing on a computer in a heterogeneous distributed computing environment. The API enables the executing application and its associated computer to remain operational while the application is analyzed and modified. The API enables a tool to analyze and modify a local application or a remote application.

The API includes a first set of APIs for modifying the IR at the various levels in the hierarchy. Thus, once the original binary code is translated into the original IR, the original IR can be easily modified at each level and then translated back to a modified binary code for injection into the system memory. The API further includes a second set of APIs for identifying processes running on various systems, managing the threads on the system, and changing the execution flow of one or more processes on the system.

In yet another embodiment, the API includes a third set of APIs for performing remote instrumentation of the heterogeneous program.

DETAILED DESCRIPTION OF THE PREFERRED EMBODIMENT

Briefly stated, the present invention provides an application program interface (API) that enables a tool to analyze and modify an application running on a computer in a heterogeneous distributed computing environment. The API provides functions for accessing and modifying code in system memory. The code in system memory may reside on a local computer along with code for the tool or may reside on a remote computer. These and other aspects of the invention will become apparent to those skilled in the art from the following detailed description.

Illustrative Operating Environment

Figure 1:
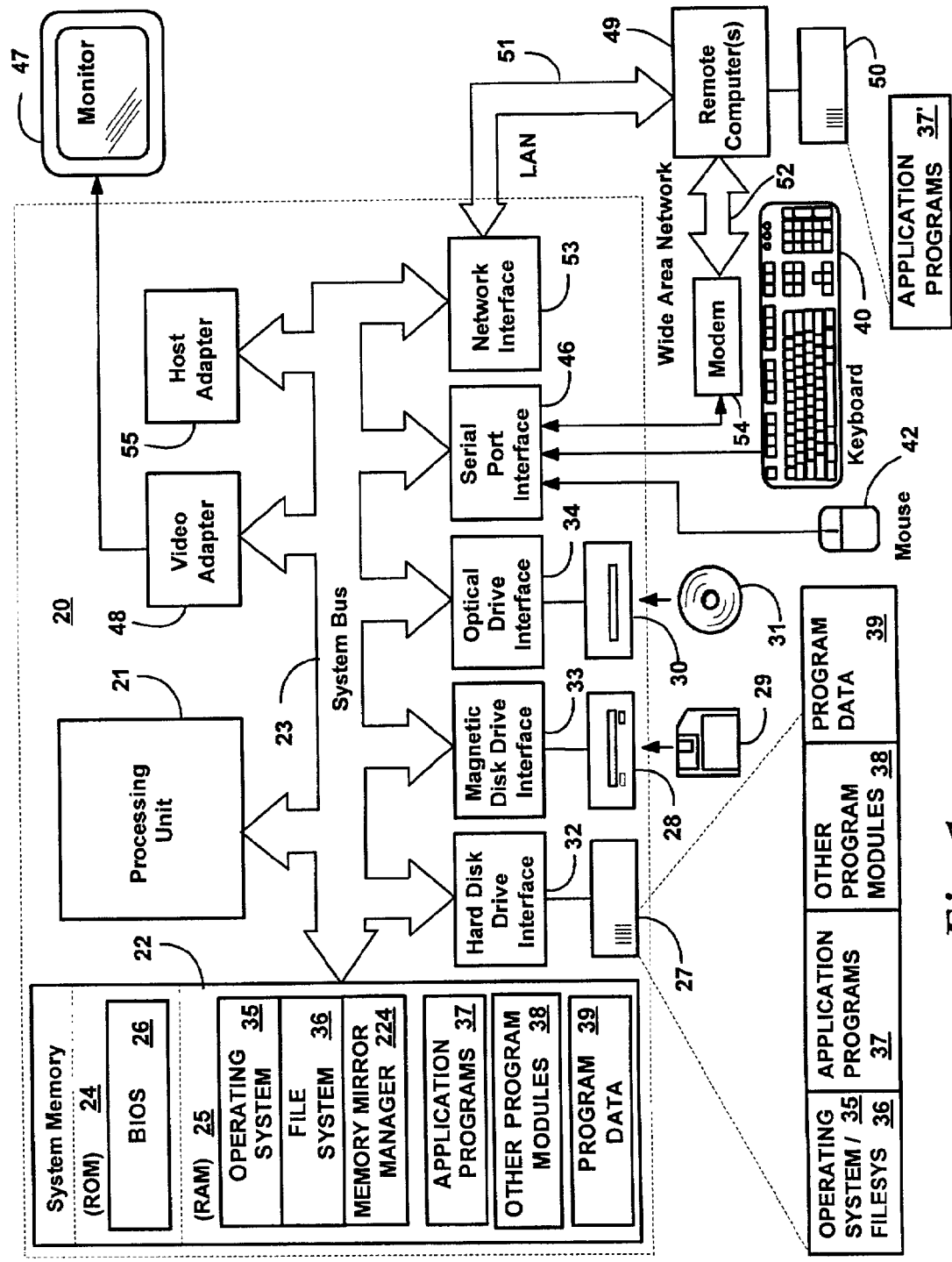
FIG. 1 illustrates an exemplary computing device for implementing one embodiment of the present invention.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. The RAM 25 may include a main physical memory subsystem and a redundant physical memory subsystem. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as Microsoft Corporation's Windows® 2000, operating system). The computer 20 includes a file system 36 associated with or included within the operating system 35, such as the Windows NT® File System (NTFS), one or more application programs 37, other program modules 38 and program data 39. For a dynamic instrumentation framework, as described herein, the application programs may include a dynamic instrumentation service, a dynamic instrumentation library and a remote proxy having an associated application program interface.

A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
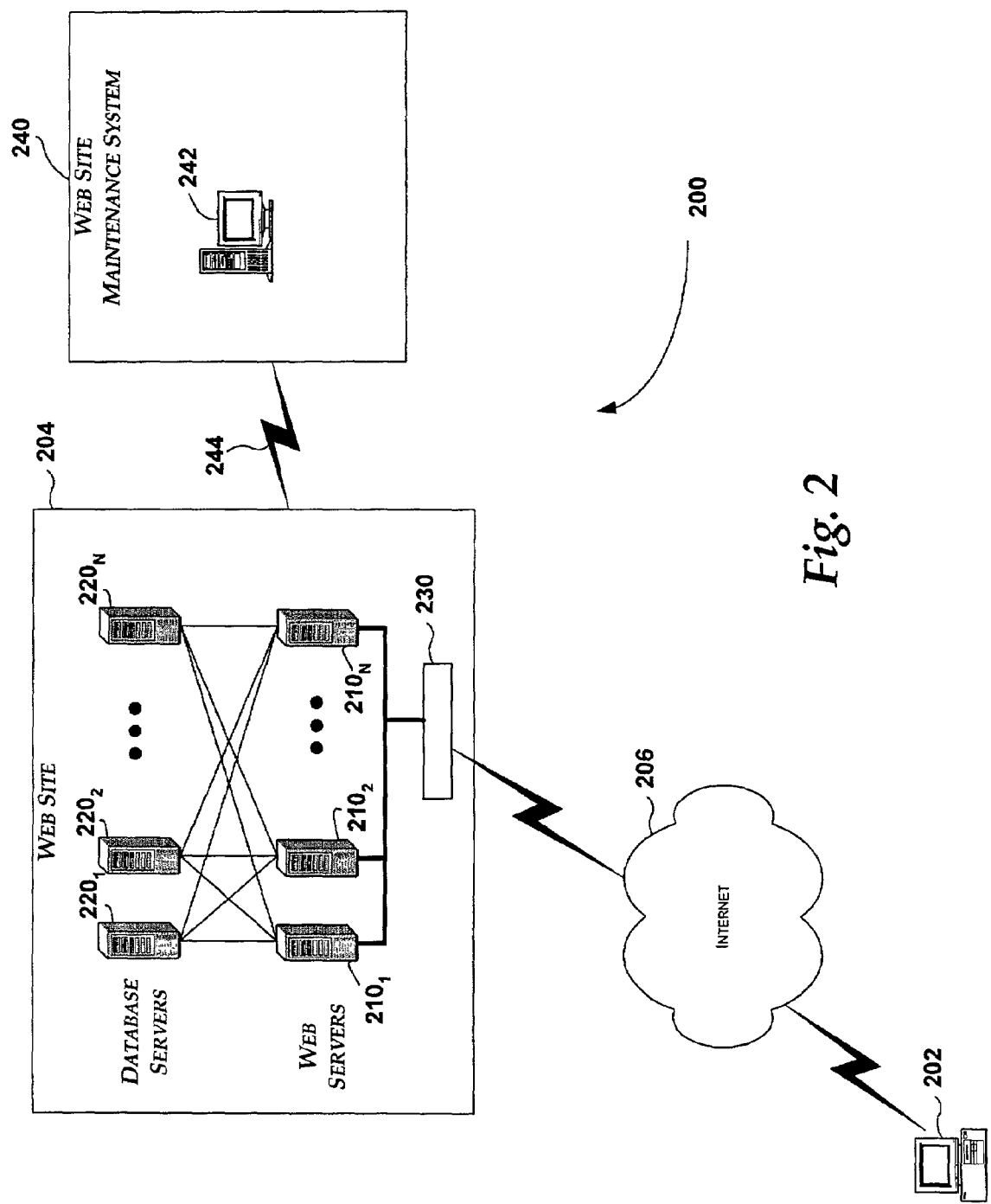
FIG. 2 illustrates an exemplary computing environment that implements one exemplary embodiment of the present invention.

FIG. 2 illustrates an exemplary computing environment 200 that implements one exemplary embodiment of the present invention. In this exemplary computing environment 200, a client computer 202 is shown accessing a web site 204 over the Internet 206. The web site 204 includes a plurality of web servers $210_{1-N}$, a plurality of database servers $220_{1-N}$, and a router 230. In this implementation, the client computer 202, the web servers 210, and the database servers 220 are each a computing device such as the one described above in conjunction with FIG. 1. Requests from the client computer 202 are input to the router 230. The router 230 then determines which web server 210 will process each request. Those skilled in the art will appreciate that web site 204 may include many other components. However, for the purposes of describing an exemplary computing environment for implementing the present invention, the general description of web site 204 is sufficient to enable those skilled in the art to practice the invention.

The exemplary computing environment 200 further includes a web site maintenance system 240. The web site maintenance system 240 includes one or more web site maintenance computers 242. The web site maintenance computer 242 is a computing device such as the one described above in conjunction with FIG. 1. An analysis tool (not shown) resides on the web site maintenance computer 242 for dynamically analyzing and modifying code running on any of the computers operating website 204, such as web servers 210 and database servers 220. The web site maintenance computer 242 communicates with website 204 over a communication link 244. As shown in FIG. 2, the web site maintenance computer 242 may be remote from the web servers 210 and the database servers 220. In another embodiment, the analysis tool may reside on each of the web servers 210 and each of the database servers 220 so that the analysis is performed locally. In either embodiment, the computing device associated with the application being analyzed remains operational.

Illustrative Dynamic Instrumentation Framework

Figure 3:
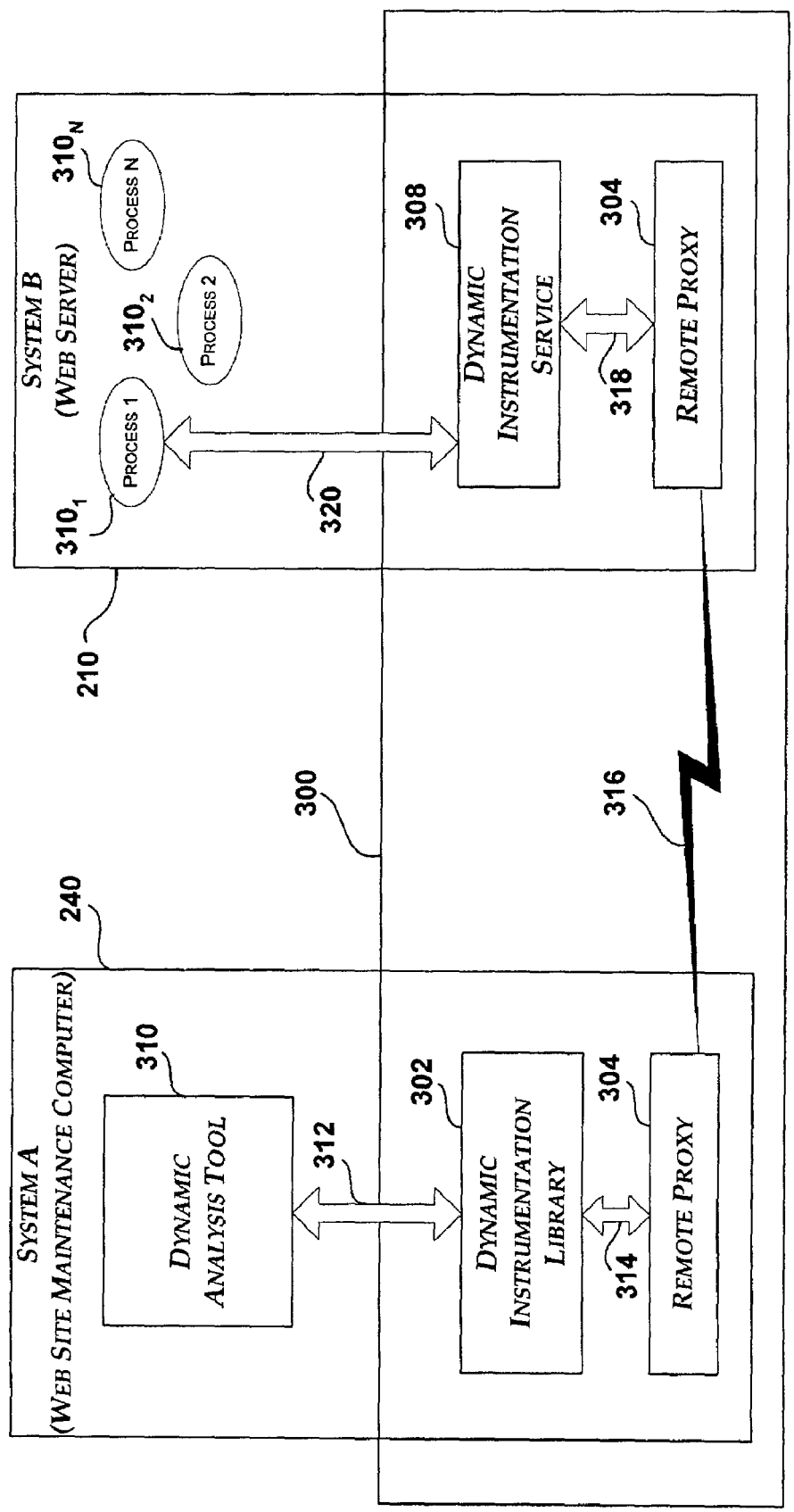
FIG. 3 is a functional block diagram of a dynamic instrumentation framework implemented within the computing environment shown in FIG. 2.
Figure 4:
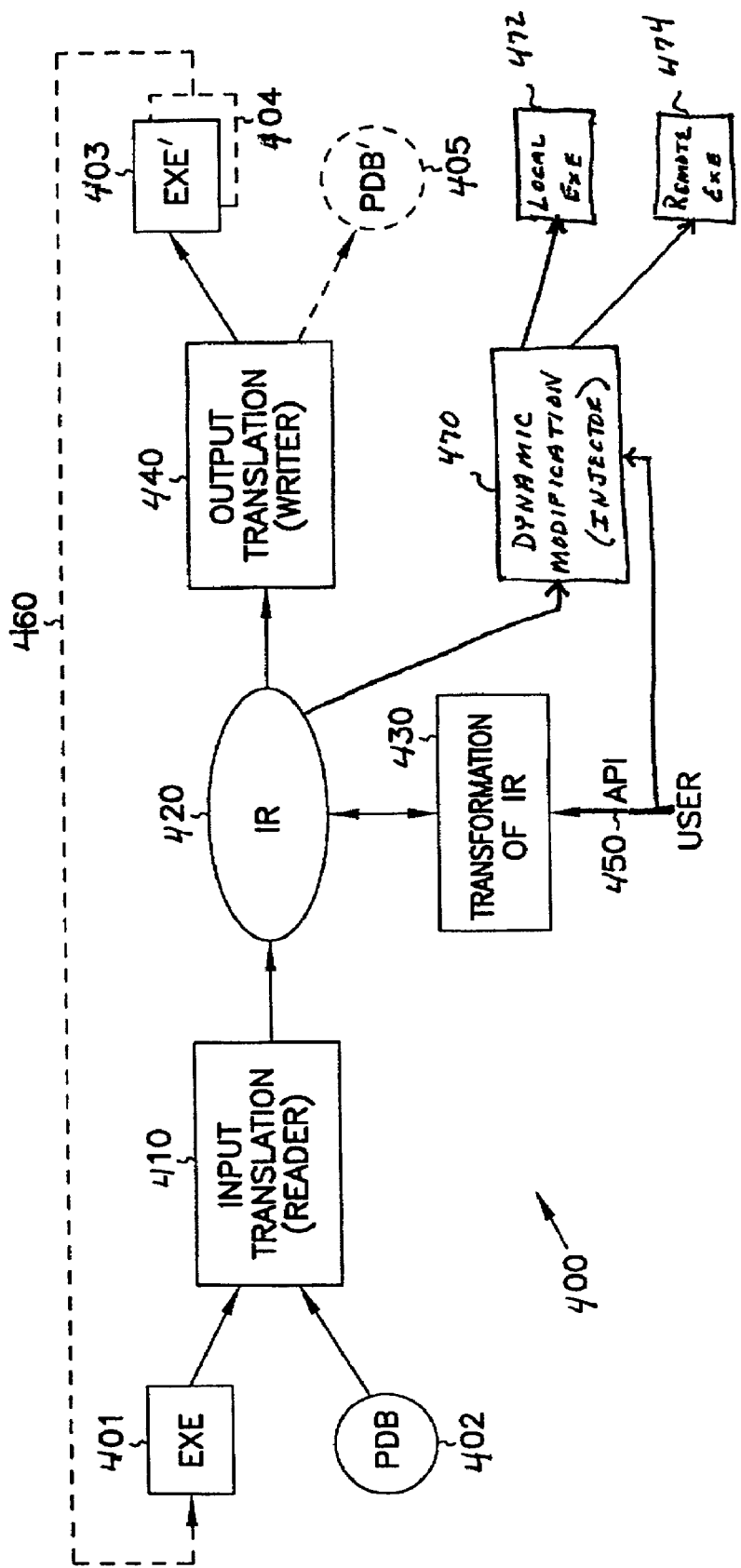
FIG. 4 is a diagram illustrating a system-level overview of the dynamic instrumentation framework shown in FIG. 3.

FIG. 3 is a functional block diagram of a dynamic instrumentation framework 300 implemented within the computing environment shown in FIG. 2. Web site maintenance computer 240 is depicted as System A and web server 210 is depicted as System B. Dynamic instrumentation framework is graphically illustrated within box 300. The dynamic instrumentation framework 300 includes a dynamic instrumentation library 302, a remote proxy 304, and a dynamic instrumentation service 308. A dynamic analysis tool 310 communicates with the dynamic instrumentation library 302 through a first set of APIs that provides navigation, query, and modification functions for an intermediate representation (IR) of a heterogeneous program or component.

In the embodiment illustrated in FIG. 3, the dynamic instrumentation library 302 communicates with the dynamic instrumentation service 308 through a remote proxy 304. The dynamic instrumentation services 308 interact with one or more processes $310_{1-N}$ through a second set of APIs. In general, the second set of APIs provides dynamic read, write, and thread management functions for modifying binary code executing in the system memory associated with processes 310. In addition, a third set of APIs enables remote instrumentation of the processes 310 over a remote communication link 316. Thus, binary code executing in processes 310 running on remote computers may be dynamically modified as if the remote process was a local process. Those skilled in the art will appreciate that the dynamic analysis tool 310 may communicate directly with the dynamic instrumentation service 308 when the processes 310 and the dynamic analysis tool 310 are running on the same computing device.

System Level Overview of the Dynamic Instrumentation Framework

FIGS. 4-7 are diagrams illustrating a system-level overview of the dynamic instrumentation framework 300 shown in FIG. 3. In general, the dynamic instrumentation framework 300 provides a mechanism for translating, transforming, and modifying components in a heterogeneous program. A heterogeneous program contains multiple executable components, such as main program code and shared libraries, written for different computer architectures (platforms) or programming languages. The system 400 comprises an input translator (reader) 410, a transformation module 430, an output translator (writer) 440 and a dynamic modifier (injector) 470. All four modules work with a high-level abstraction of a heterogeneous program, referred to as an "intermediate representation" (IR) 420. The IR is a symbolic representation that represents the functionality of the heterogeneous program.

Figure 5:
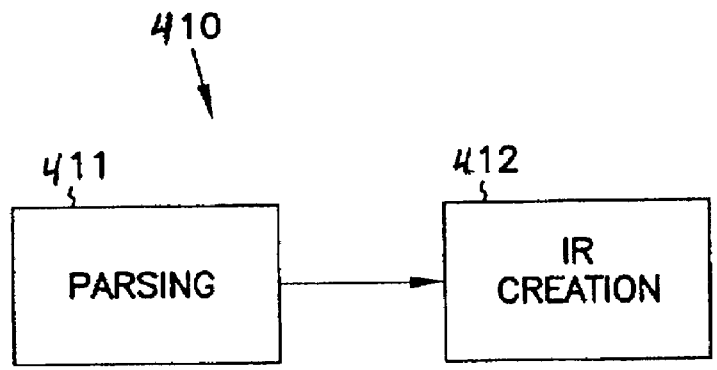
FIGS. 5-7 are diagrams illustrating additional details of the system-level overview shown in FIG. 4.
Figure 6:
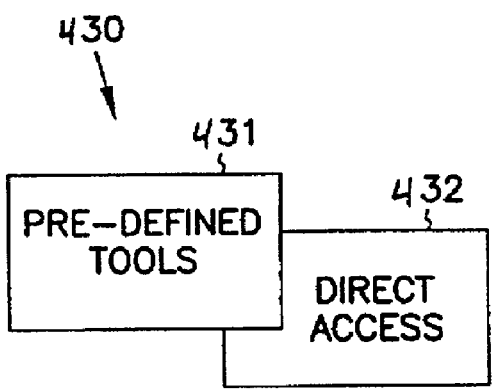

The reader 410 creates an IR 420 from an executable component (EXE) 401. In a static mode, the executable component (EXE) may be retrieved from a file stored on a storage media. In a dynamic mode, the executable component (EXE) may be retrieved from the system memory of a local or remote computing device. The reader 410 is a two-stage process as shown in FIG. 5. First, the executable 401 is parsed 411 into its basic blocks of code and data using information provided in a program database file (PDB) 402. As is well known in the art, a basic code block is defined as a code block having a single entry point and a single exit point. In an alternate embodiment, all the work performed by the parser 411 is input directly into the second stage of the reader 410, thus skipping the parsing process.

Once the code and data blocks are identified, an IR creation process 412 evaluates each platform-dependent instruction on a block-by-block basis. There are very large set of common instructions regardless of architecture, i.e., move, store, add, etc., that can be represented by a single platform-neutral IR instruction. For RISC (reduced instruction set computer) architectures, most, if not all, instructions can be easily translated into a single platform-neutral IR instruction. On the other hand, CISC (complex instruction set computer) architectures, such as the Intel x86 family, contain complex instructions that provide the function of multiple instructions. In one exemplary embodiment, the platform-dependent instructions that have a single platform-neutral IR instruction counterpart are translated into that platform-neutral instruction, while complex instructions are replicated as-is within the IR through an extended version of the basic IR instruction. A replicated complex instruction is marked with a signature that denotes its architecture. The output translator 440 recognizes a single complex instruction and processes it. In an alternate embodiment, a complex instruction is represented by a set of platform-neutral IR instructions that perform the equivalent function.

Figure 8:
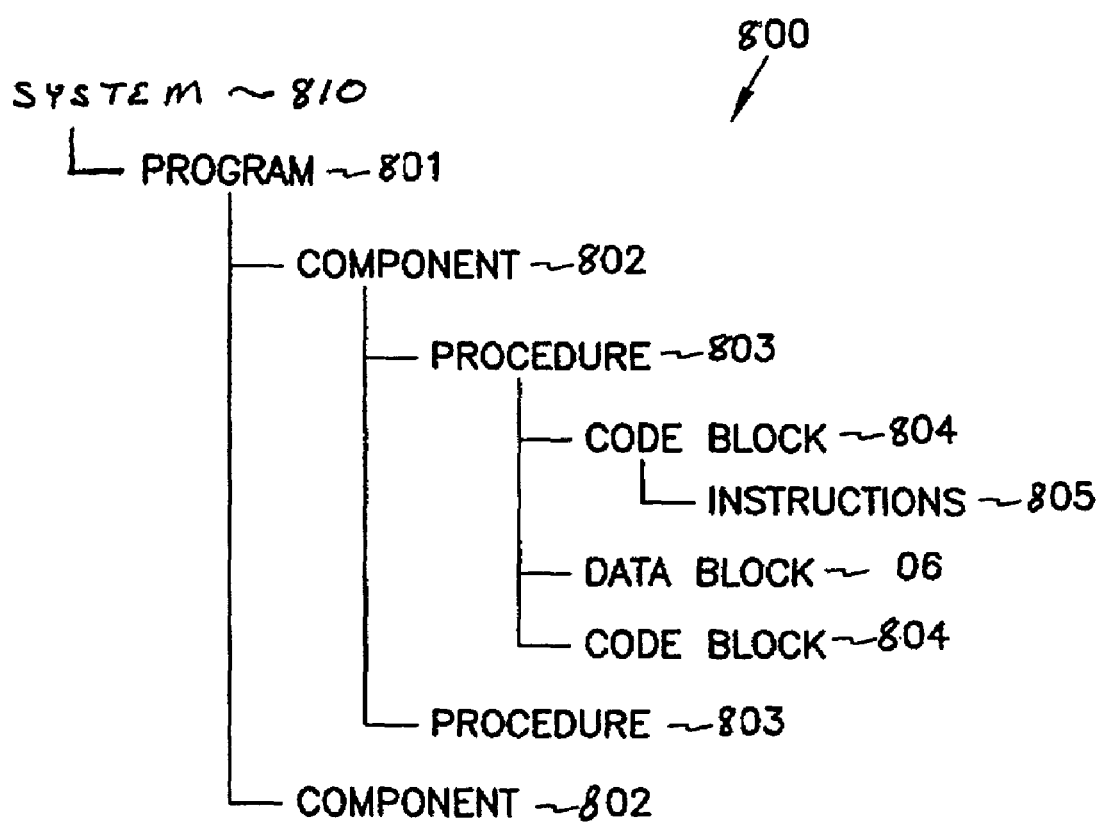
FIG. 8 is a diagram of an intermediate representation hierarchy used in the dynamic instrumentation framework of the present invention.

After the instructions in the code blocks have been translated, the IR creation process 412 creates a logical hierarchical view of the executable 401 as illustrated in FIG. 8. All architectures share the basic concepts of instructions 805, code blocks 804, data blocks 806, components 802, and procedures 803, so the IR hierarchy 800 enables the user to understand the structure of the intermediate representation of a heterogeneous program 801. In the dynamic instrumentation framework 300 of the present invention, the IR hierarchy 800 further includes a system level 810. The system level 810 allows the reader 410 and the injector 470 to perform dynamic analysis and modification of the executable 401 on any available computing device. The code blocks are logically connected as specified in the EXE file 401 so that the blocks can be more easily manipulated during the transformation process 430. Procedures are determined by following the logical connections using information provided in the PDB file 402. Procedures are collected together to create the program components. Little or no optimization of the program is performed by the creation process 412 since it is desirable that the intermediate representation be as close to what the programmer originally wrote as possible.

However, tracing the logical connections to determine the procedures can result in more procedures being created than originally coded by the programmer. Therefore, the creation process 412 annotates, or "decorates," the hierarchy 800 with the user names supplied in the symbol table for the EXE 401. The annotations enable the user to understand how the IR control flows and how the elements of the IR hierarchy correspond to the procedures and the components in the original code so the appropriate transformations can be applied to the IR. The annotations are maintained in data structures for the procedures during the transformation process and output by the output translator 440.

At the end of the creation of the IR hierarchy, all instructions are represented in the hierarchy as IR instructions within code blocks so that there is no differentiation between code written for one platform and code written for a second platform.

Once the intermediate representation is complete, the user is allowed to manipulate the code and data (illustrated by the IR transformation module 430) and to dynamically modify or inject code and data (illustrated by the dynamic modification module 470) through an application program interface (API) 450. The exemplary embodiment of the system 400 provides some pre-defined tools 431 (FIG. 6) used to instrument and optimize the IR that are guaranteed to be safe in that the tools will evaluate a change requested by the user and only manipulate the code in an appropriate manner. The API 450 also permits the user direct access 432 to the IR to navigate through the IR and to make changes, such as moving blocks between procedures, modifying blocks, rearranging the logical connections between blocks, and changing the platform-specific instruction set for a code block.

By instrumenting the IR using the tools 431, the user can now modify one or more of the various components of a heterogeneous program and write the modification into memory for execution. This process is described in detail in the related "Dynamic Modifications to a Heterogeneous Program in a Distributed Environment" patent application.

Figure 7:
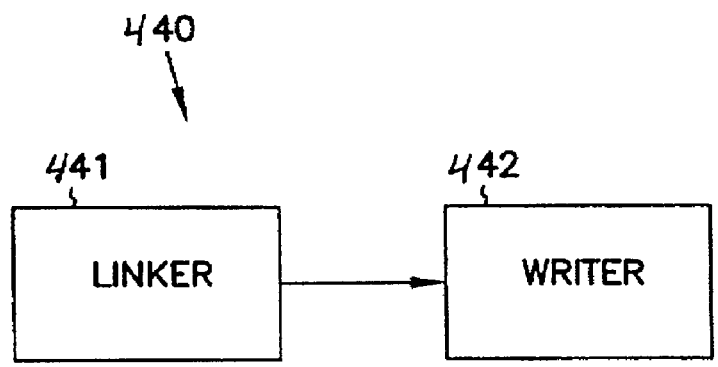

The transformed IR may now be input into the output translator 440. The output translator 440 operates on the IR in two phases as shown in FIG. 7: a linker phase 441 that resolves the logical connections into absolute addresses in an address space for a modified version of the executable, and a writer phase 442 that assembles the IR into the modified version of the executable (EXE') 403. The blocks in the executable 403 can be emitted by the writer 442 for their original platform, or can be emitted for a different platform.

When the linker 441 is used, the linker 441 must maintain the semantics of the code of the hierarchy when resolving the addresses, i.e., preserve the logical connections between blocks and the location of referenced data. The linker 441 determines the size of each code block based on the length of each instruction in the block. The linker 441 is also responsible for adding whenever prologue and epilogue code necessary to "glue" together contiguous blocks that will be assembled into different platform-dependent instructions. As part of the address resolution, the linker 441 also can perform limited code modification or optimization. For example, assume that prior to the transformation process 430, there was a jump between two code blocks, but those blocks are now contiguous. In this case, the linker 441 removes the now-unnecessary jump and lets the logic flow fall through to the second block. Because the hierarchy extends down to the instruction level and is consistent regardless of the manipulation performed by the user, the linker 441 has more knowledge of the placement of instructions than did the programmer. Thus, in architectures in which instructions have both a long and short form depending on the location they are addressing, the linker 441 chooses the appropriate instruction size, which can be a better choice than that originally made by the programmer.

The writer 442 assembles each IR instruction into its platform-dependent counterpart based on the architecture specified in the code block. In an exemplary embodiment in which complex instructions are replaced in the IR, if the complex instruction is being written to the same platform, the writer 442 merely emits the instruction. If the complex instruction is designated to be translated into a different architecture, the writer 442 creates the appropriate set of platform-specific instructions to perform the same function as the original, complex instruction.

As part of the EXE' 403, the writer 442 creates an emitted block information data structure containing the annotations created by the reader process 410 for each block in the executable. This allows the EXE' 403 to be iterated through the entire process 400 as many times as desired (represented by phantom arrow 460), while enabling the user to distinguish the original procedures from those added in a previous iteration. In an alternate embodiment, the emitted block information is combined with the PDB file 402 to create a new version of the program database file (PDB') 405 (shown in phantom).

In an alternate exemplary embodiment of the translation and transformation system 400 not illustrated, the IR containing the absolute addresses assigned by the linker 441 is used as input into the IR creation process 412 for further iteration through the system 400. One of skill in the art will immediately appreciate that much of the work performed by the creation process 412 as described above can be skipped when iterating the modified IR through the system 400. This embodiment allows the user to transform a heterogeneous program in stages rather than having to make all the changes in a single pass through the system 400.

In an exemplary embodiment of the present invention, the transformed IR may be input into the dynamic modifier 470. The dynamic modifier 470 determines whether the transformed IR needs to be "patched" or "injected". Patching occurs when the transformed IR is the same size as the original IR. In this case, the modified instructions corresponding to the transformed IR can be written over the original instructions in the system memory. Injecting occurs when the transformed IR is a different size than the original IR. In this case, a copy of the original instructions is created, the modified instructions corresponding to the transformed IR are committed into system memory, and then the execution is redirected to the modified instructions. The execution may be redirected by inserting a jump instruction in the memory location corresponding to the first original instruction. The jump then redirects the flow to the modified instructions. In both patching and injecting, the dynamic modifier 470 may suspend threads from processing on the system, write changes into the system memory, and resume the threads for processing.

The system level overview of the operation of an exemplary embodiment of the invention has been described in this section of the detailed description. A translation, transformation, and modification system translates a binary component into an intermediate representation, provides an application program interface through which a user can transform the intermediate representation, translate the intermediate representation as transformed by the user into a modified version of the binary, or redirect the execution of a component to a modified version of the binary. While the invention is not limited to any particular arrangement of modules, for sake of clarity exemplary set of modules has been described. One of skill in the art will readily recognize that the functions attributed to the modules described in this section can be assigned to different modules without exceeding the scope of the invention. Furthermore, although the translation and transformation of only one input component (EXE 401) has been illustrated and described above, the system can take multiple components, and accompanying PDB files, as input. Likewise, the system can dynamically modify multiple components running on various systems.

Exemplary Embodiment of the Dynamic Application Program Interface

The dynamic API and the functions it provides are described in object-oriented programming terms, but one of skill in the art will immediately perceive that the invention is not so limited. As mentioned above, the dynamic API 450 in accordance with the present invention includes a first and a second set of APIs. The first set of APIs (Tables 1-2) provides an interface to the IR for pre-defined tools 231, direct access 232 by a user, and for the output translator (writer) 240. An exemplary set of APIs is described in detail in the related "Application Program Interface for Transforming Heterogeneous Programs" patent application, which is hereby incorporated by reference. The first set of APIs of the present invention expands upon that exemplary set by modifying some of the APIs to work in the dynamic instrumentation framework 300 in accordance with the present invention. The second set of APIs (Table 3) provides an interface to the IR for pre-defined tools 231, direct access 232 by a user, and for the dynamic modification (injector) 470. In another embodiment, the dynamic API 450 further includes a third set of APIs. The third set of APIs (Table 4) provides an interface for remote instrumentation of the heterogeneous program.

Tables 1-4 consist of the API calls, the elements that expose each call, the function provided by the call, and a remarks section. Except where noted, the API calls that do not specify arguments perform their function relative to the most recently returned ("current") element of the appropriate element class. One of skill in the art will readily recognize that the categories below are not rigid and that various API calls provide functions that fit into more than one category.

For consistency, the first set of APIs of the present invention is described using the six categories defined for the exemplary set of APIs described in the above-mentioned related application. The six categories included 1) navigation functions; 2) query functions; 3) modification functions; 4) instrumentation functions; 5) output translation functions; and 6) miscellaneous functions. Briefly, the navigation functions enable movement through elements in the hierarchy 800, the query functions return information about the current element of its class and the structure of the IR hierarchy 800, the modification functions enable the IR to be changed at all levels in the hierarchy, the instrumentation functions enable "probe" code to be inserted at any level in the IR hierarchy, the output translation functions enable the output of platform-specific instructions based on the contents of the IR, and the miscellaneous functions enable pre-defined tools to initiate access to the IR.

The dynamic instrumentation framework 300 of the present invention may utilize the exemplary APIs for the navigation, query, output translation, and miscellaneous functions. Thus, the first set of APIs includes changes to functions within the modification functions (Table 1) and the instrumentation functions (Table 2).

Modification:

TABLE 1

| IR Element | API Call | Function | Remarks |
| --- | --- | --- | --- |
| Component | CreateImport(dll, func) | Provides a pointer to that can be used to call the imported function | Block returned can be used to call target to call new import |
| | RedirectProc(procedure name, to procedure) | Redirect a local procedure to another local procedure | Place a jump at the beginning of this procedure which goes to the other address |
| | RedirectImport(import, to) | Redirect an import to different procedure | Replaces the pointer to the imported function with a pointer to the other procedure |
| | RedirectExport(export, to) | Redirect an export to a different procedure | Replaces the pointer to the exported function with a pointer to the different procedure |
| Block | SetBlockTarget(block) | Sets target block of current element | Only works on calls and jumps |
| | SetProcTarget(procedure) | Sets the target procedure of current element | Only works for calls and jumps |
| | SetImportTarget(import) | Sets target import of current element | Only works for calls and jumps |

Instrumentation:

TABLE 2

| IR Element | API Call | Function | Remarks |
| --- | --- | --- | --- |
| Procedure, Block | Commit( ) | Converts the procedure or block to machine instructions and copies instructions into the target process | Returns the address of the instructions in the target process |
| Component, Procedure, Block, Instruction | AddCall(element, location) | Add a call (with optional parameters) at the specified location in the target process | |

The second set of APIs provides an interface to the IR for pre-defined tools 231, direct access 232 by a user, and for the dynamic modification (injector) 470. As illustrated in the IR hierarchy 300, the dynamic instrumentation framework 300 of the present invention includes a system object 310. The system object 310 allows the pre-defined tools to access a machine to determine the processes that are currently running on the system. The second set of APIs includes the exported APIs related to the system object. In addition, the second set of APIs includes functions for managing threads, changing the flow of execution, and accessing system memory.

Dynamic:

TABLE 3

| IR Element | API Call | Function | Remarks |
|---|---|---|---|
| System | Open(machine, flag) | Allocates system structures into main memory | Opens a machine |
| | RefreshProgs( ) | Updates the list of programs running on the system | Returns the number of new programs detected on the system |
| | FirstProg( ) | Returns the first program in current system | Allows iteration of the programs in the system |
| | CountProg( ) | Returns the number of programs on the current system | |
| | Destroy( ) | Deletes system from main memory | Frees up system component |
| Program | OpenDynamic(process id, flag, machine) | Open a program that is running | If process id is −1, open current process |
| | OpenDynamic(command line, flag, machine) | Open a program by launching it | |
| | CloseDynamic(exitCode) | Returns process' exit code | Terminate the process opened in dynamic mode |
| | IsProcessLive( ) | Checks whether this program is attached to a live process | |
| | AllocateMemory(size) | Returns address | Allocate memory in a remote process as read/write/execute. |
| | WriteMemory(address, size, *pv) | Returns flag indicating success or failure | Write memory in the process |
| | ReadMemory(address, size, *pv) | Returns flag indicating success or failure | Read memory in the process |
| | Resume( ) | Restart the live process | Reference counted |
| Component | RedirectImport(import from, address) | Redirect an import/external procedure to an address | Redirection is automatically committed |
| | RedirectExport(export from, address) | Redirect an export to an address | |
| | RedirectProc(process from, address) | Redirect a local procedure to an address | |
| | DynamicSetLocalModuleName (local image name) | Identify path to local binary | Allows local binary to be used for building IR rather than remote binary |
| Procedure | Copy( ) | Create a copy of this procedure. | An optional userdata parameter provides a map from the old blocks to the new blocks and back. |
| Block | ReplaceInstructions(block, component, old copy) | Replace contents of block with new content | Original instructions are moved and committed |
| Instruction | SetOperand(operand) | Modifies an instruction in the remote process | This may fail if the modified instruction will not fit in the existing space |

The third set of APIs provides an interface for remote instrumentation of the heterogeneous program. Thus, binary code executing in processes running on remote computers may be dynamically modified as if the remote process was a local process.

Remote:

TABLE 4

| Interface | API Call | Function | Remarks |
|---|---|---|---|
| VRemoteSystem | EnumProcesses(list of process ids, size of list) | Get a list of the process identifiers on the remote machine | |

TABLE 4-continued

| Interface | API Call | Function | Remarks |
|---|---|---|---|
| | EnumProcessModules( process handle, list of component addresses, size of list, ) | Enumerate the components loaded in the specified process | Returns address of component |
| | CreateImport(process handle, module name, import name, import ordinal, returned address) | Get the address of a exported procedure in the specified module | Returns address of new import |
| | CreateRemoteThread( process handle, startAddress) | Start a thread running in the process at the specified address | Returns success or failure |
| | GetExitCodeProcess( process handle, exit code) | Get the exit code of the specified process | |
| | GetModuleName(process handle, module handle, module name) | Get the name of the specified component | |
| | GetModuleInfo(process handle, module handle, size, pb, cb) | Get the size and entry point of the specified component | |
| | GetRoutineAddresses(LL address, GPA address) | Get the address of a routine in the component | |
| | IsDriver(process handle) | Determines whether the process is kernel or user mode | |
| | IsProcessAlive(process handle) | Determines whether the process is still alive | |
| | LoadDriver(driver name, device, module handle) | Load driver into remote kernel mode address space | |
| | MoveThreadsInRange( process handle, from address, to address, size) | Move threads in range to new piece of memory | |
| | ReadMemory(process handle, address, size, pointer) | Read memory from the specified process | |
| | ResumeThreads(process handle) | Resume threads in the specified process | |
| | SuspendThreads(process handle, process id) | Suspend threads in the specified process | |
| | WriteMemory(process handle, address, size, pointer) | Write memory to the specified process | |
| | VirtualAlloc(process handle, size, dwMem, dwPage, address) | Allocate memory in the specified process | |
| | VirtualFree(process handle, cbAlloc, dw) | Free memory in the specified process | |
| | OpenProcess(process id, process handle) | Request access to the specified process | |
| | CreateProcess(command line, identifier) | Create a process | |
| | TerminateProcess( process handle, exit code) | End a process | |

The dynamic application programming interface described above allows a tool, such as a debug tool, to take over the portion of code causing a problem and allows static and profile data to be generated for determining a fix for the problem. While the above example is based on a debugging tool for an internet web site, those skilled in the art will recognize that the teachings of the present application may be applied to many other environments.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A computerized system comprising:
 a processing unit;
 a system memory coupled to the processing unit through a system bus;
 a computer-readable medium coupled to the processing unit through a system bus;
 a hierarchical intermediate representation for a heterogeneous program in the system memory;

a transformation process that is configured to execute in the processing unit and that is configured to modify the hierarchical intermediate representation to create a modified intermediate representation associated with the heterogeneous program;

a dynamic modification process that is configured to execute in the processing unit; and an application program interface that is configured to be executed from the computer-readable medium by the processing unit, wherein the dynamic modification process is configured to call the application program interface to cause the processing unit to modify the system memory associated with the heterogeneous program running in the system memory based on the modified intermediate representation.

2. The computerized system of claim 1, wherein the dynamic modification process is further configured to call the application program interface to cause the processing unit to suspend processing of other programs executing in the system memory.

3. The computerized system of claim 1, wherein the dynamic modification process is further configured to call the application program interface to cause the processing unit to resume processing of the other programs executing in the system memory.

4. The computerized system of claim 1, wherein modifying the system memory associated with the heterogeneous program causes the processing unit to change execution flow of the heterogeneous program.

5. The computerized system of claim 1, wherein the heterogeneous program is configured to execute on a remote computing device with a remote system memory, the dynamic modification process calls the application program interface to cause a remote processing unit to modify the remote system memory.

6. The computerized system of claim 5, wherein the dynamic modification process is further configured to call the application program interface to cause the remote processing unit to suspend processing of other running programs running in the remote system memory.

7. The computerized system of claim 5, wherein the dynamic modification process is further configured to call the application program interface to cause the remote processing unit to resume processing of the other programs running in the remote system memory.

8. An application program interface embodied on a computer-readable medium for execution on a computer in conjunction with a hierarchical intermediate representation of a heterogeneous program, the application program interface comprising:

a navigation function that returns program information for a specified computing device;

a query function that returns information about a program on the specified computing device;

a thread management function for controlling execution of other programs on the specified computing device; and a modifier function for modifying the heterogeneous program residing in a system memory on the specified computing device.

9. The application program interface of claim 8, wherein the navigation function includes:

a first program function that returns a first program on the specified computing device.

10. The application program interface of claim 8, wherein the query function includes a counting function that returns a number representing a count of programs executing on the specified computing device.

11. The application program interface of claim 8, wherein the thread management function includes:

a suspend function that suspends other programs from executing on the specified computing device; and a resume function that resumes the execution of the other programs on the specified computing device.

12. The application program interface of claim 8, wherein the modifier function includes a patch function that overwrites a portion of the system memory originally storing part of the heterogeneous program with a new binary code for the heterogeneous program.

13. The application program interface of claim 8, wherein the modifier function includes an injector function that writes a new binary code in a portion of the system memory that did not originally store an original binary code for the heterogeneous program, and that writes a jump instruction in a first location of the system memory that stored the original binary code, the new binary code being a modification to the original binary code and the jump instruction transferring execution to the new binary code.

14. The application program interface of claim 8, wherein the specified computing device is a remote computing device.

15. An application program interface embodied on a computer-readable medium for execution on a computer, the application program interface comprising:

a first set of functions for creating a hierarchical internal representation of a heterogeneous program and for modifying the hierarchical internal representation to create a modified internal representation; and a second set of functions for dynamically modifying a system memory in which the heterogeneous program is executing, the system memory being modified based on the modified internal representation of the heterogeneous program.

16. The application program interface of claim 15, wherein the second set further includes functions for controlling processing of other programs executing in the system memory.

17. The application program interface of claim 15, wherein the second set further includes functions for changing an execution flow of the heterogeneous program.

18. The application program interface of claim 15, further comprising a third set of functions for modifying a remote system memory if the heterogeneous program is executing in a remote system memory on a remote computer.

19. A computer-readable medium having computer-executable instructions stored thereon to provide an interface to a hierarchical intermediate representation of a heterogeneous program comprising:

an instruction application interface exposed by an instruction element in the hierarchy for navigating, querying, modifying, translating, and committing an inspection in the intermediate representation;

a block application interface exposed by a block element in the hierarchy for navigating, querying, modifying, and committing a block in the intermediate representation;

a procedure application interface exposed by a procedure element in the hierarchy for navigating, querying, modifying, and committing a procedure in the intermediate representation;

a program application interface exposed by a program element in the hierarchy for modifying and querying the intermediate representation for the heterogeneous program; and a system application interface exposed by a system element in the hierarchy for determining the program element available on a computing device.

20. The computer-readable medium of claim 1, further comprising a remote application interface for determining a program element when the computing device is a remote computing device.

* * * * *